Aug. 22, 1967 R. C. WILSON 3,337,104
TRIGGER RELEASED PINCH ROLLER MECHANISM
Filed May 31, 1966

INVENTOR.
REX C. WILSON
By Lulwider, Patton, Rieber, Lee, and Utecht
ATTORNEYS

United States Patent Office 3,337,104

Patented Aug. 22, 1967

3,337,104

TRIGGER RELEASED PINCH ROLLER MECHANISM

Rex C. Wilson, Granada Hills, Calif., assignor to Muntz Stereo-Pak, Inc., Van Nuys, Calif., a corporation of California Filed May 31, 1966, Ser. No. 554,088
8 Claims. (Cl. 226—90)

The present invention relates to improvements in tape recorder and playback machines and, more particularly, to a novel actuating mechanism for a pinch roller in a tape recorder or tape player adapted to handle endless-type tape carrying cartridges.

Endless-type tape carrying cartridges generally include a tape reel supported for turning within a flat housing together with means for guiding tape from the inside of the reel along a rear side of the housing and back to the outside of the reel. The rear side of the housing includes a plurality of openings for receiving the record or playback head and the tape driving capstan of a tape recorder or playback machine.

In the tape recorder or playback machine, the record or playback head and the capstan extend above the top of a flat, horizontal top deck and are spaced slightly from each other. A guide member extends from the back to the front of the top deck to guide the cartridge onto the deck to a position where the record or playback head and the capstan extend slightly into the openings and engage the tape along the rear side of the cartridge.

In order for the capstant to drive tape from and to the reel in the cartridge, the tape must be in tight engagement with the capstan as it turns. To bring the tape into tight engagement with the capstan, the machine includes a hard rubber pinch roller movable from a lower position below the top deck, through an opening in the deck to a raised position opposite and against the capstan. To accommodate such movement of the pinch roller, the cartridge includes a bottom hole for receiving the pinch roller such that in its raised position the pinch roller presses a length of tape tightly against the capstan allowing the turning of the capstan to drive the tape from the reel.

Various mechanisms have been employed to move the pinch roller between its lower to raised positions. Possibly the most common mechanism comprises a slide arm-cam arrangement connected to a rocker shaft carrying the pinch roller. In such an arrangement, manual sliding movement of the arm between forward and rearward positions turns the rocker shaft to swing the pinch roller between the lowered and raised positions.

In an attempt to reduce the manual effort required to raise and lower the pinch roller, semiautomatic mechanisms have been proposed wherein manual movement of a slide arm swings the pinch roller through a predetermined arc and energizes electric means for swinging the pinch roller through the balance of its arc to the raised position.

Other actuating mechanisms have been developed which are responsive to movement of the tape cartridge over the deck to bring the pinch roller into driving relationship with the capstan. Unfortunately, such mechanisms have heretofore been rather complex and expensive.

In each of the foregoing types of actuating mechanisms, the pinch roller is rigidly held in the raised position until manually released. This means that as the pinch roller wears, the rocker shaft must be repositioned slightly if tight driving contact is to be maintained between the tape and capstan. Adjustment of the rocker shaft may also be required if the temperature changes sufficiently to alter the resiliency of the pinch roller.

Accordingly, it is an object of the present invention to provide an improved pinch roller actuating mechanism for tape recorder and playback machines adapted to use endless-type tape cartridges.

It is another object of the present invention to provide an actuator of the foregoing character which is simple in design, sturdy in construction, inexpensive to manufacture, and easy to operate.

A further object of the present invention is to provide an improved pinch roller actuator of the foregoing character which is extremely reliable in operation.

Still another object of the present invention is to provide an improved pinch roller actuator for tape recorder and playback machines adapted to handle endless-type tape cartridges, which automatically compensates for wearing and changes in the resiliency of the pinch roller.

The foregoing as well as other objects and advantages of the present invention may be more clearly understood by reference to the following detailed description when considered with the drawing which, by way of example only, illustrates one form of actuator mechanism embodying the features of the present invention.

Figures 1, 4:
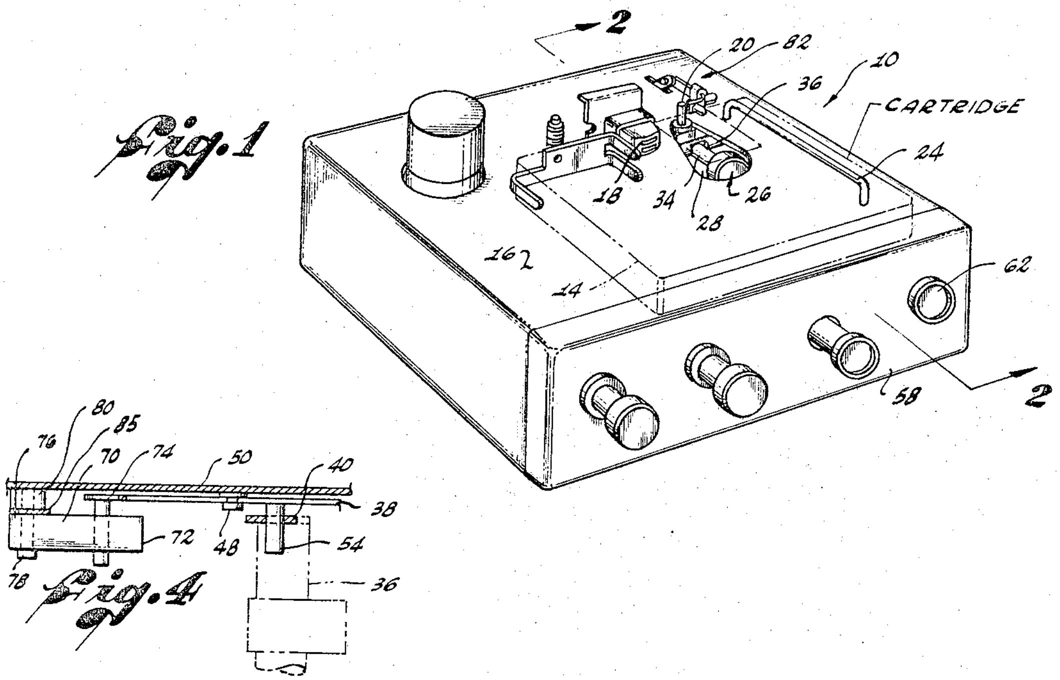
FIGURE 1 is a perspective view of a tape handling machine including a pinch roller actuator embodying the features of the present invention.
FIGURE 4 is a fragmentary sectional top view taking along the line 4—4 in FIGURE 3.

In the drawing, the tape handling machine is represented generally by the numeral 10 and is adapted to play back signal information recorded on a magnetic tape 12 contained in an endless-type tape cartridge 14. Generally speaking, the tape handling machine 10 includes a top deck 16 above which extends a playback head 18 and a tape driving capstan 20. The capstan 20 is driven by a drive means 22 stationed below the top deck, extends vertically above the deck, and is spaced laterally from the playback head 18. A guide bar 24 also extends above the top of the deck 16 and is adapted to guide the cartridge 14 rearward over the deck to a position where the capstan 20 and playback head 18 extend slightly into associated openings in the cartridge to engage the tape 12.

In order to bring the tape 12 into tight engagement with the capstan 20 such that a turning of the capstan moves the tape past the playback head 18, the tape handling machine 10 further includes a pinch roller 26. The pinch roller 26 is adapted for movement from a lower position below the deck 16 (see FIGURE 2) to a raised position above the deck and tightly against the capstan (see FIGURE 3). In moving from the lower to the raised positions, the pinch roller 26 swings through a top opening 28 in the deck and a corresponding bottom opening 30 in the cartridge 14 to press a length of recording tape 12 against the capstan 20.

The present invention is directed to an actuating mechanism 32 for manually moving the pinch roller 26 to the lower position, and for automatically moving the pinch roller to the raised position to bring a length of the tape 12 into driving engagement with the capstan 20 in response to rearward movement of the cartridge 14 over the deck 16 to the position wherein the playback head 18 and capstan extend into the openings in the cartridge.

In order that the actuating mechanism 32 may accomplish the foregoing, the pinch roller 26 is supported for turning on one end of a connecting rod 34. An opposite end of the rod 34 is connected to a horizontal rocker shaft 36. The rocker shaft 36 is bearing mounted to the underside of the deck 16 such that a turning of the rocker shaft swings the pinch roller 26 between its lowered and raised positions.

The actuating mechanism 32 is adapted to turn the rocker shaft 36 and includes a slide arm 38 and a lever arm 40. The slide arm 38 includes front and rear elongated slots 42 and 44 for receiving pin members 46 and 48 extending from a right side 50 of the machine to guide the arm in a fore-aft direction. The lever arm 40 also includes an elongated slot 52 and is connected to the left end of the rocker shaft 36. A pin member 54 extending laterally from the slide arm 38 rides in the elongated slot 52 such that rearward movement of the slide arm moves the pinch roller 26 to its lower position and forward movement of the slide arm causes the pinch roller to swing upwardly through the opening in the top deck to its raised position.

A coil spring 56 connected between the slide arm 38 and the front panel 48 of the machine 10 continuously urges the slide arm toward a forward position to swing the pinch roller 26 to its raised position. In this respect, it should be noted that the coil spring 56 continues to spring bias the pinch roller 26 against the capstan 20 even when the pinch roller is in the raised position. Therefore, as the pinch roller 26 wears, the spring 56 continues to urge the pinch roller tightly against the capstan. Similarly, should the resiliency of the pinch roller 26 change due to changes in temperature, the spring 56 in effect compensates for changes in the resiliency by continuously urging the pinch roller tightly against the capstan to maintain tight driving contact between the tape and capstan.

The front end of the slide arm 38 is connected by a crosspiece 60 to the rear end of a pushbutton knob 62. The pushbutton knob 62 is supported for sliding movement in an opening 64 in the front panel 58 and extends through a supporting collar 66 around the inside of the opening. By pressing inwardly on the knob 62, the slide arm 38 is moved rearward under the deck 16 and the pinch roller 26 returned to its lowered position below the deck. Thus, the knob acts as a manual return for the pinch roller 26 to bring the pinch roller to the lower position below the top deck to allow a cartridge 14 to be inserted onto or removed from the top of the deck.

When the slide arm 38 is in the rearward position, a catch means 68 engages the slide arm to relasably hold the pinch roller 26 below the top of the deck 16. In the illustrated form of the invention, the catch means 68 includes a latch arm 70 having a forward hooked end portion 72 for engaging a pin 74 connected to a rear end portion of the slide arm 38. The rear end portion of the latch arm 70 is connected to a sleeve 76. The sleeve 76 extends around a horizontal pin 78 connected to the right side wall 50 of the machine and is separated from the side wall by a washer 80 (see FIGURE 4). The latch arm 70 is therefore free to swing in a vertical plane about the horizontal pin 78.

The catch means 68 is connected to a trigger device 82. The trigger device 82 includes a generally horizontal trigger arm 84, a connecting arm 85 and a coil spring 86. The trigger arm 84 extends over the top of the deck 16 with a tip end 88 immediately adjacent the capstan 20. The connecting arm 85 is pivotally connected by a pin 90 to a rear end portion of the trigger arm 84 and is fixedly connected to the right end of the sleeve 76 as illustrated most clearly in FIGURE 4. The coil spring 86 is connected to the connecting arm 85 and to the underside of the deck 16 forward of the capstan 20 and continuously exerts a forward force on the trigger arm 84 causing the connecting arm 85 to normally engage an end of a slot 92 in the top deck receiving the connecting arm with the tip 88 slightly forward of the capstan (see FIGURE 2).

In the forward position, the tip 88 is adapted to engage the rear side of the tape cartridge 14 as the cartridge is moved over the deck 16 adjacent the capstan 20. This condition is illustrated most clearly in FIGURE 3 wherein the rear side of the cartridge 14 presses against the tip 88 causing the trigger arm 84 to pivot the latch arm 70 upwardly away from the pin 74 on the slide arm 38. As this occurs, the catch means 68 is released and the slide arm 38 rapidly returns to a forward position under the influence of the coil spring 56 causing the pinch roller 26 to rapidly swing to its raised position to press a length of the tape 12 tightly against the capstan 20. Turning motion of the capstan 20 then drives the tape within the cartridge past the playback head 18.

When it is desired to remove the cartridge 14 from the machine 10, the knob 62 is pressed in until the catch means 68 engages the pin 74 on the slide arm 38 thereby locking the slide arm in its rearward position. As the slide arm moves to the rearward position, the pinch roller 26 is retracted to its lower position allowing the cartridge to be easily removed from the machine simply by sliding forward on top of the deck 16.

Figure 2:
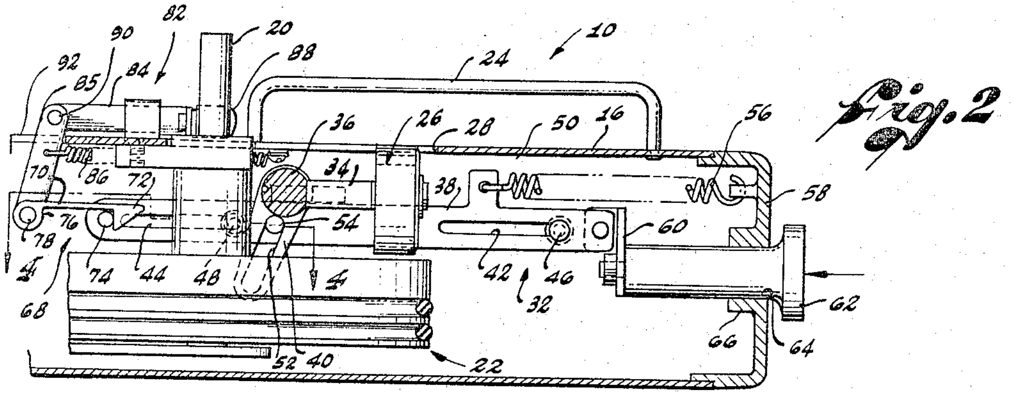
FIGURE 2 is a sectional view of the tape handling machine taken along the line 2—2 in FIGURE 1 illustrating the pinch roller in a lower position and the actuator in a cocked condition.
Figure 3:
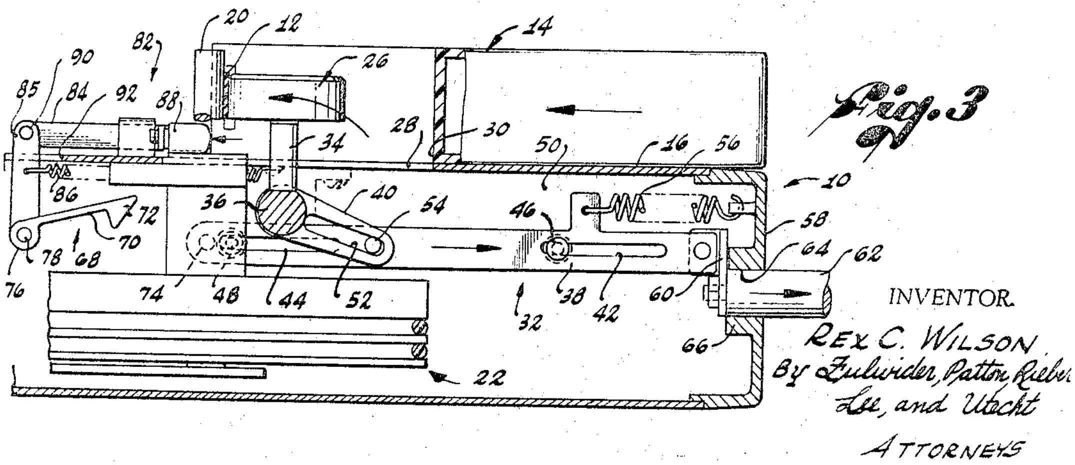
FIGURE 3 is a cross-sectional side view similar to FIGURE 2, showing the pinch roller in a raised position and the actuator in a fired condition.

The machine is then in the condition illustrated in FIGURE 2 with the trigger device 82 cocked and ready for automatic actuation upon the insertion of a tape cartridge into the machine 10 on top of the deck 16 adjacent the capstan 20.

From the foregoing description, it is appreciated that the present invention provides a simple actuating mechanism for bringing tape into driving engagement with a capstan in a tape handling machine adapted to handle endless-type tape cartridges. In addition, the actuating mechanism continuously spring biases a pinch roller against the capstan when in a raised position to compensate for a wearing of the pinch roller or changes in its resiliency.

While the actuating mechanism has been described in conjunction with a pinch roller, it is appreciated that the same or similar mechanism may be employed in a device for engaging and forcing a pinch roller containing cartrdige toward a capstan to hold a length of tape in driving engagement with the capstan.

Also, rather than including an arrangement for swinging a pinch roller through an opening in the deck, different systems for raising and lowering the pinch roller or other cartridge engaging mechanisms may be employed without departing from the present invention. These, as well as other changes and modifications, may be made in the illustrated form of the actuating mechanism without departing from the spirit of the invention. It is therefore intended that the present invention be limited in scope only by the terms of the following claims.

I claim:

1. In a tape recorder or playback machine having a top deck and a tape driving capstan extending above said deck, a mechanism for automatically bringing a length of tape in a tape carrying cartridge into driving engagement with said capstan comprising:
- movable means for moving between a lowered position below said deck and a raised position above said deck to bring a length of tape in said cartridge into driving engagement with said capstan;
- spring means connected to said movable means for moving said movable means from said lowered to raised positions;
- means for moving said movable means from said raised to lowered positions;
- catch means for holding said movable means in said lowered position;
- and trigger means responsive to movement of said cartridge adjacent said capstan for releasing said catch means whereby said movable means automatically moves to said raised position under the influence of said spring means.

2. The combination of claim 1 wherein said spring means is further adapted to continuously urge said movable toward said capstan when said movable means is in said raised position.

3. The combination of claim 2 wherein said movable means includes a pinch roller adapted for swinging movement through an opening in said deck and an opening in said cartridge to press said length of tape against said capstan.

4. In a tape recorder or playback machine having a top deck and a tape driving capstan extending above said deck, a mechanism for automatically bringing a length of tape in a tape carrying cartridge into driving engagement with said capstan comprising:

an arm movable between first and second positions;

spring means for moving said arm from said second to said first positions;

catch means for holding said arm in said second position;

trigger means extending above said deck for engaging said cartridge when adjacent said capstan and for releasing said catch means;

movable means for moving between a lowered position below said deck and a raised positon above said deck to bring a length of tape in said cartridge into driving engagement with said capstan;

and means connected to said arm for moving said movable means between said lowered and raised positions upon movement of said arm between said second and first positions.

5. The combination of claim 4 wherein said movable means includes a pinch roller connected to a rocker shaft for swinging movement through an opening in said deck and an opening in said cartridge to press said tape against said capstan and said means connected to said arm includes means for rotating said rocker shaft.

6. The combination of claim 5 wherein said spring means continuously urges said pinch roller toward said capstan when in said raised position.

7. The combination of claim 5 wherein said arm is movable between said first position toward the front of said machine and said second position toward the rear of said machine, and said spring means is connected to said arm and to a forward portion of said machine whereby movement of said arm to said second position extends said spring means and said spring means is in tension when said arm is in said second position to spring bias said pinch roller against said capstan.

8. The combination of claim 7 including a second spring means for continuously urging said trigger toward said front of said machine.

References Cited

UNITED STATES PATENTS

| | | | |
|---|---|---|---|
| 2,914,620 | 11/1959 | Dale | 242—55.13 X |
| 3,301,564 | 1/1967 | Platt | 242—55.13 X |

M. HENSON WOOD, Jr., *Primary Examiner.*

ALLEN N. KNOWLES, *Examiner.*